REIBER & SCHRADER.
King Bolt.
No. 77,528. Patented May 5, 1868.
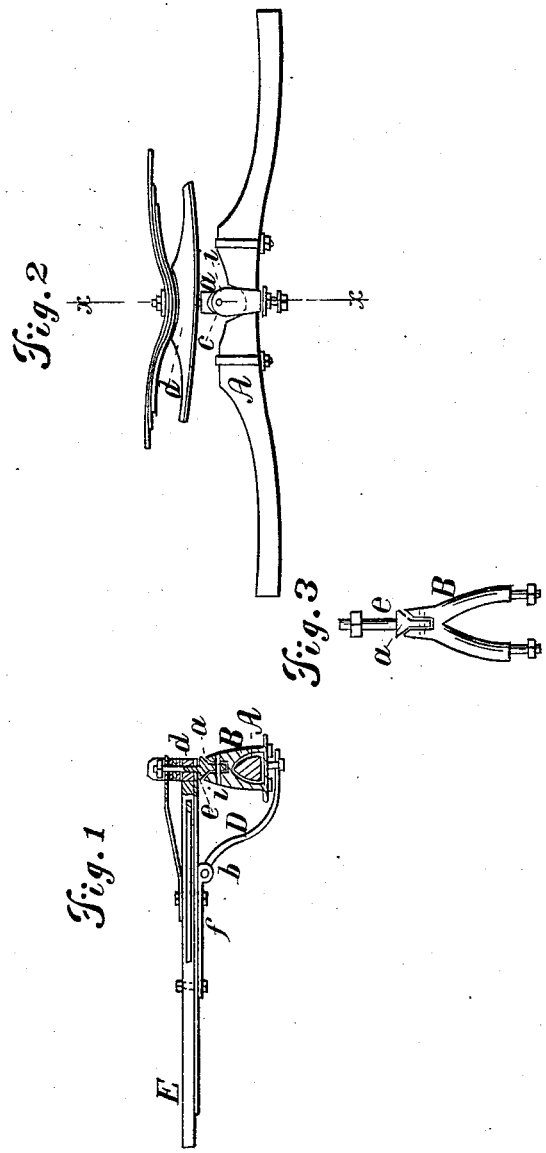

United States Patent Office.

JOHN REIBER AND JOHN SCHRADER, OF BRIDGEPORT, ILLINOIS, ASSIGNORS TO THEMSELVES AND W. M. LEWIS, OF SAME PLACE.

Letters Patent No. 77,528, dated May 5, 1868.

KING-BOLT FOR CARRIAGES.

The Schedule referred to in these Letters Patent and making part of the same.

TO ALL WHOM IT MAY CONCERN:

Be it known that we, JOHN REIBER and JOHN SCHRADER, of Bridgeport, in the county of Lawrence, and State of Illinois, have invented a new and useful Improvement in King-Bolts for Carriages; and we do hereby declare that the following is a full, clear, and exact description thereof, which will enable others skilled in the art to make and use the same, reference being had to the accompanying drawings, forming part of this specification, in which—

Figure 1 is a central section of our invention through the line $x\ x$ of fig.

Figure 2 is a front view of the invention.

Figure 3 is a detail view of the bolt.

Similar letters of reference indicate like parts.

The object of this invention is to provide a jointed king-bolt for coupling the front and rear axles of carriages, whereby the front axle is permitted to vibrate laterally when the wheels strike any obstacle or obstruction, or pass over any uneven portion of ground.

In the accompanying plate of drawings, the front axle is shown at A. B is the clip, which is united with the king-bolt $e$, upon which the head-block $d$ turns by a joint, as shown, $i$ being the pivot-bolt, passing through the lugs $c\ c$ and the eye $a$. The brace D is also provided with an eye-joint, $b$, which allows it to vibrate with the axle. The eye-plate $f$ of this joint is bolted to the coupling, as shown.

Having thus described our invention, we claim as new, and desire to secure by Letters Patent—

1. The jointed bolt $d$, in combination with the clip B and head-block $d$, substantially as and for the purpose shown and described.

2. The brace D, having joint $b$, in combination with the clip B, jointed king-bolt $d$, axle A, and coupling E, all substantially as and for the purpose shown and described.

JOHN REIBER,
JOHN SCHRADER.

Witnesses:
HUGH K. LAUTERMAN,
JACOB GARING.